Jan. 22, 1952          W. HARROWER          2,583,050
                  VALVE OPERATING MECHANISM
Filed Sept. 26, 1945                    2 SHEETS—SHEET 1

INVENTOR
William Harrower
BY
Ramsey, Kent + Chisholm
ATTORNEYS

Patented Jan. 22, 1952

2,583,050

UNITED STATES PATENT OFFICE 2,583,050

VALVE OPERATING MECHANISM

William Harrower, Jersey City, N. J., assignor to Everlasting Valve Company, Jersey City, N. J., a corporation of New Jersey Application September 26, 1945, Serial No. 618,675

10 Claims. (Cl. 251—18)

This invention relates to emergency valves which may be operated only on rare occasions, such as for fire protection, but in which it is of the greatest importance that there be no failure of the valve in the emergency. Such valves may have application to open a conduit for the supply of fire extinguishing fluid, or to cut off the flow of inflammable liquids or gases. Such valves may stand for long periods without test; and valves which have not been operated for long periods may become caked with sediment or accretions, or the faces of cooperating parts long under pressure may "seize," so that unusual force may be required to start the valve from the position in which it has long remained. Since it is of the greatest importance that such valves shall not fail in the emergency when it occurs, it has been a practice to employ very heavy operating weights sometimes weighing several hundred pounds, which are released upon occurrence of the emergency and swing to operate the valve. The use of such heavy swinging weights makes necessary especially strong shoring or bracing of the valve and the conduits adjacent thereto.

An object of this invention is to eliminate the excessively heavy operating mechanism and the expense and inconvenience inherent therein, and to improve the certainty of action of such valves.

Another object of the invention is to provide an emergency valve actuated by eccentric gears which go out of mesh when the valve has been actuated, leaving the valve unaffected by the motion or oscillation of the operating weight as it comes to rest.

Another object of the invention is to provide a valve actuated by eccentric gears which go out of mesh, and which may be certainly restored into correct mesh on resetting of the valve operating lever.

An additional object of the invention is to improve emergency operation by a structure which applies an increased portion of the force or energy of the operating weight to the work of starting the valve, and a decreased portion to a completion of the operation thereof.

A further object of the invention is to provide a valve having improved pendulum-type operating mechanism which requires no arresting device that could shock or strain the valve or adjoining conduits.

A still further object of the invention is to provide an emergency valve provided with an eccentric operating gear that locks out of mesh to hold the valve in operated condition and which has a long tooth for resetting the valve to non-operated condition.

Various other objects and advantages will be apparent from the detailed description to follow. In the description as well as in the claims parts are at times identified by specific names for convenience, but such nomenclature is intended to be as generic in its application to analogous parts as the prior art will permit. My invention is clearly defined in the appended claims. The best form in which I have contemplated applying my invention is illustrated in the accompanying drawings, in which:

Figure 1:
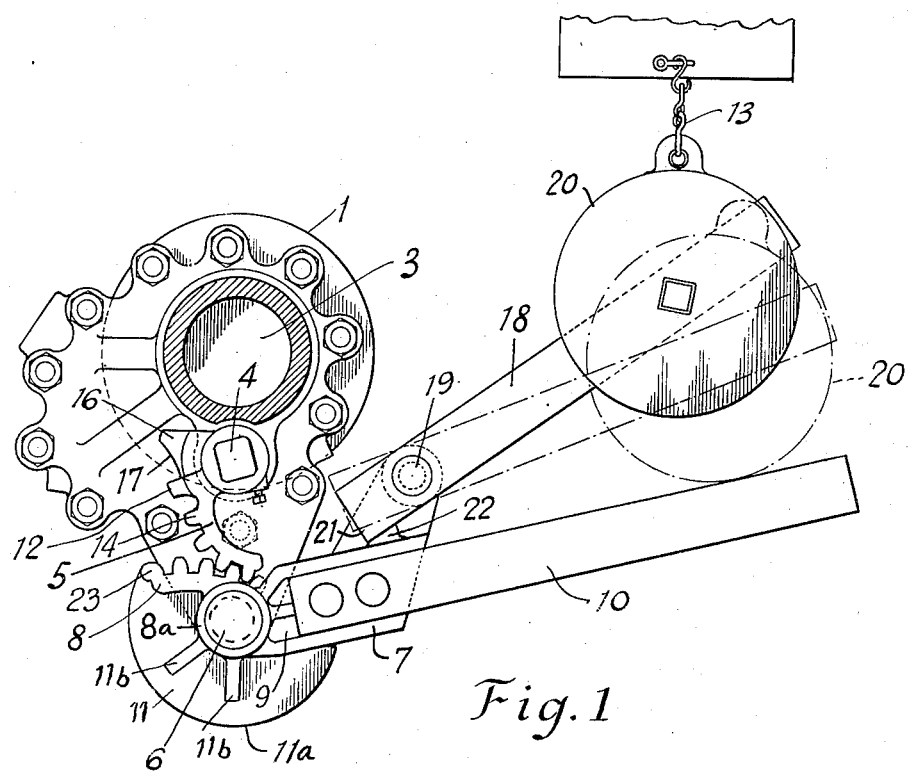
Figure 1 is a front elevation, partially in section, showing a valve of the present invention in non-operated condition.

Referring to the drawings, 1 is the casing of a preferred valve according to my invention, having a plane ported valve seat 2 and a gate 3 having a plane face movable over the valve seat, and operated by a shaft 4. Shaft 4 extends through the valve casing 1 to the outside thereof and has rigidly affixed thereto an eccentric gear-sector 5. The valve body 1 carries on the outside thereof a stub shaft 6 on which is captively mounted a rotatable member 7 having integral therewith an eccentric gear-sector 8 adapted to mesh with gear-sector 5. Rotatable member 7 has a radially disposed recess or channel 9 in which is secured, by rivets or otherwise, an operating lever 10, whereby gear-sector 8 may be rotated to communicate motion to gear-sector 5, and thereby oscillate valve gate 3, either to open or close the valve.

In Figure 1 the valve gate 3, which in the preferred form is a swinging gate, is illustrated as closed which is the non-operated position for a so-called "opening" type valve, i. e., a valve which opens upon occurrence of the emergency. With the gear-sectors in the position illustrated in Figure 1, the angular movement of lever 10 and gear-sector 8 will be in the ratio of two-to-one to the angular movement of gear-sector 5 and gate 3; that is to say, the operating lever 10 will have its greatest leverage upon gate 3 at the beginning of its movement. On the other hand, after the gate has been started from its position of rest, the ratio of angular movement between operating lever 10 and gate 3 will decrease rapidly, causing the gate to move quickly to its open position.

Figure 2:
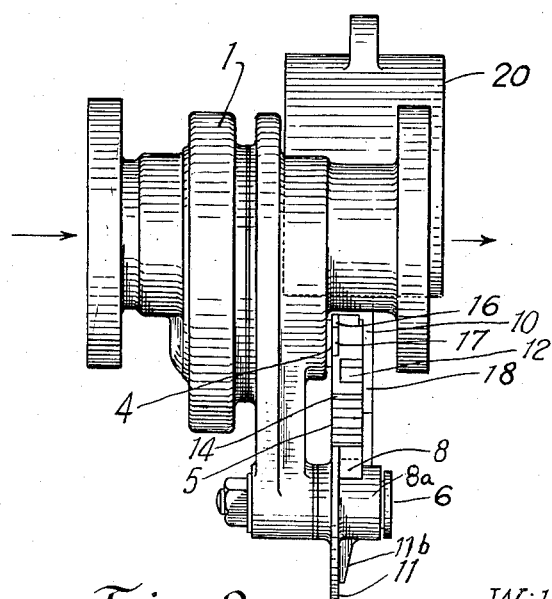
Figure 2 is a partly diagrammatic side elevation of the valve in non-operated condition.

Rotatable member 7 is provided with a flange 11 having an arcuate edge 11a which is concentric with stub shaft 6. The flange 11 is integral with gear-sector 8 and the hub 8a and is reenforced by integral radial ribs, such as ribs 11b. With the exception of tooth 12 of sector 5, all of the teeth of gear-sectors 5 and 8 have an axial dimension or thickness such that they extend from the left-hand face of flange 11 in Figure 2 to a cross-axial plane which is spaced substantially from the right-hand face of flange in Figure 8.

Figure 3:
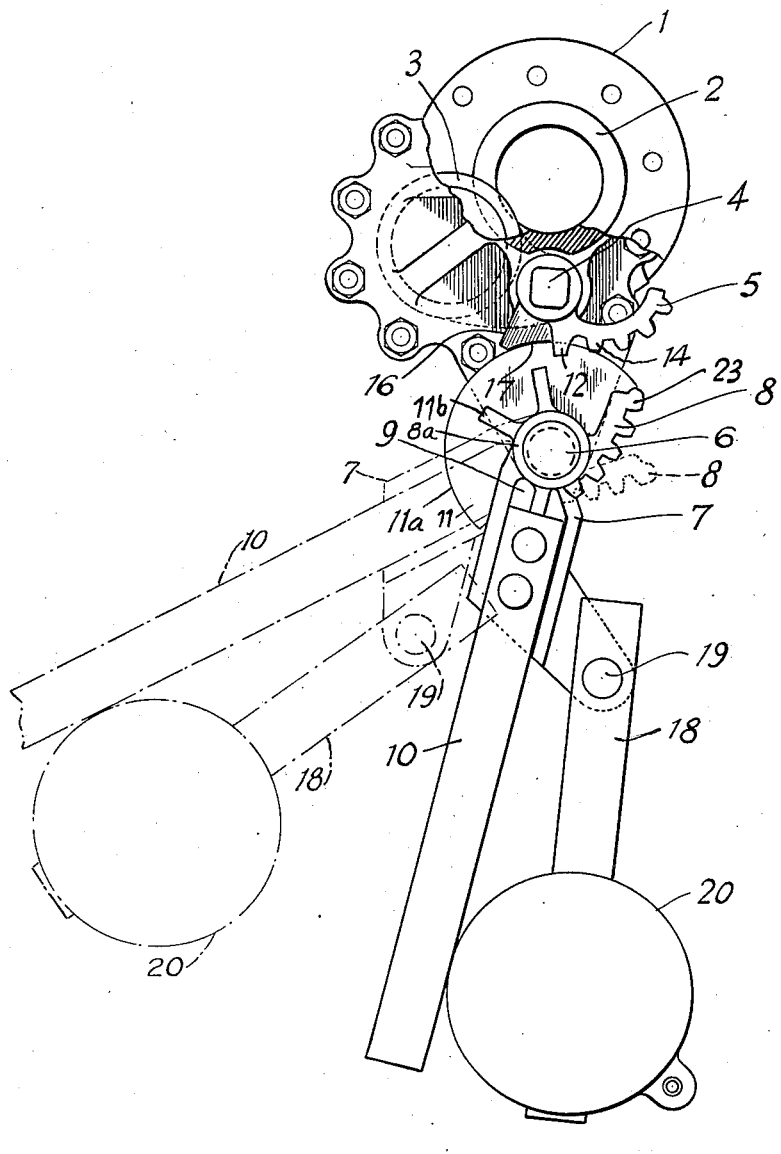
Figure 3 is a front elevation, partially in section and with parts broken away, showing the valve in operated condition.

When the lever 10 is rotated clockwise from the Figure 1 position, the gear-sectors rotate until the teeth pass out of mesh, at which point gear-sector 8 ceases to actuate gear-sector 5 and the lever 10 and gear-sector 8 continue their rotation idly in a circular path as indicated in dot-dash lines in Figure 3. When the teeth of the gear-sector 8 pass out of engagement with the teeth of gear-sector 5, tooth 12 on gear-sector 5 comes into substantial coincidence with a line joining the axes of shafts 4 and 6 (see Figure 3). Tooth 12 is a long tooth extending beyond the eccentric line established by the tips of the other teeth of gear-sector 5. The long tooth 12 is of reduced axial dimension and is arranged to pass in front of flange 11 in Figure 3 (to the right of flange 11 in Figure 2). Adjacent to long tooth 12 is a projection or lug 16 on gear-sector 5 which has a circular concave surface 17 substantially conforming to the convex edge 11a of flange 11; and this lug prevents continued rotation of gear-sector 5 by the surface 17 coming into contact with the periphery 11a of flange 11. As shown in Figure 3, the peripheral edge 11a of the flange 11 also extends beneath the tip of the last regular tooth of gear-sector 5 (tooth 14) and thereby blocks reverse movement of gear-sector 5. It is thus obvious that while lever 10 and gear-sector 8 may oscillate freely after the gear-sectors have passed out of mesh the gear-sector 5 is locked against movement in either direction during such oscillation.

When the valve gate has been in closed position for a long time (possibly years), it is apt to be stuck in position or "seized"; and to start the opening movement of the valve it is expedient that the initial application of opening torque be made by a sudden blow applied to lever 10. To that end there is provided an arm 18, pivoted at 19 to rotatable member 7 and having a weight 20 on the outer end thereof. This weight may be releasably supported by a fusible link 13 in such position that on being released it may fall freely through a certain distance, swinging about pivot 19, until the weight 20 strikes lever 10 with a hammer blow (see dot-dash lines of Fig. 1) which starts the gate 3 from its closed position. Thereafter the weight 20 continues its downward movement, swinging lever 10 and completing the opening of the valve. After the valve has been opened the weight 20, arm 18 and lever 10 will continue to oscillate as a pendulum until such time as they come to rest, but during that oscillation gate 3 will be held in open position as previously explained.

While weight 20 has been shown as supported in stand-by position by a fusible link 13, it will be understood that such other releasable supporting means, manually operable or automatically operable, may be employed as is suited to the particular purpose for which the valve is used.

Weighted arm 18 is capable of only limited angular separation from lever 10, being pivoted at 19 on the rotatable member 7 and the angular separation being limited by contact of the end 21 of arm 18 with abutment 22 on the rotatable member 7. When it is desired to restore the valve to its initial position, arm 18 and weight 20 are moved toward the original suspended position. As soon, however, as the end 21 of arm 18 comes into contact with abutment 22, arm 18 becomes an operating lever for the rotation of element 7 and gear-sector 8. On the return movement tooth 23 of gear-sector 8 engages long tooth 12 of gear-sector 5, first having passed by tooth 14. Further return rotation of element 7 causes the teeth of gear-sectors 8 and 5 to again come into mesh in their proper relation to each other; and when the arm 18 and weight 20 have reached their initial position, the gate 3 will be closed.

At present the invention finds its greatest applicability in a so-called "opening" type of valve, i. e., a valve which opens upon occurrence of a fire or other emergency. Accordingly, an "opening" type of valve has been shown by way of illustration. However, the invention is equally applicable to a "closing" type of valve, i. e., a valve which closes upon occurrence of a fire or other emergency.

I claim:

1. A valve comprising: a flow-controlling element movable from non-operated position to operated position; driving and driven eccentric gear-sectors operable to move the flow-controlling element from non-operated position to operated position and then move out of mesh, the teeth of one of said gear-sectors being disposed at progressively increasing distance from the axis of that gear-sector and the teeth of the other of said gear-sectors being disposed at progressively decreasing distance from the axis of that gear-sector, and such eccentricity of the gear-sectors providing one gear-ratio of drive to the flow-controlling element at the beginning of its movement from non-operated position and another gear-ratio of drive to the flow-controlling element as it moves into operated position; means to hold the flow-controlling element in operated position while the gear-sectors are out of mesh; and means to restore the gear-sectors to mesh as the driving gear-sector is returned toward non-operated position.

2. A valve comprising: a flow-controlling element movable from non-operated position to operated position; driving and driven eccentric gear-sectors operable to move the flow-controlling element from non-operated position to operated position and then move out of mesh, the teeth of the driving gear-sector being disposed at progressively increasing distance from the axis of the driving gear-sector and the teeth of the driven gear-sector being disposed at progressively decreasing distance from the axis of the driven gear-sector, and such eccentricity of the gear-sectors providing relatively low gear-ratio drive to the flow-controlling element at the beginning of its movement from non-operated position with increased gear-ratio drive as the flow-controlling element moves toward operated position; interengageable means movable with the gear-sectors and operative to hold the flow-controlling element in operated position while the gear-sectors are out of mesh; and means to restore the gear-sectors to mesh as the driving gear-sector is returned toward non-operated position.

3. A valve comprising: a flow-controlling element movable from non-operated position to operated position; driving and driven eccentric gear-sectors operable to move the flow-controlling element from non-operated position to operated position and then move out of mesh, the teeth of one of said gear-sectors being disposed at progressively increasing distance from the axis of that gear-sector and the teeth of the other of said gear-sectors being disposed at progressively decreasing distance from the axis of that gear-sector, and such eccentricity of the gear-sectors providing one gear-ratio of drive to the flow-controlling element at the beginning of its movement from non-operated position and another gear-ratio of drive to the flow-controlling element as it moves into operated position; interengageable means carried by the gear-sectors and operative to hold the flow-controlling element in operated position while the gear-sectors are out of mesh, and interengageable means carried by the gear-sectors and operative to restore the gear-sectors to mesh as the driving gear-sector is returned toward non-operated position.

4. A valve comprising: a gate swingable from non-operated position to operated position; driving and driven eccentric gear-sectors operable to swing the gate from non-operated position to operated position and then move out of mesh, the teeth of the driving gear-sector being disposed at progressively increasing distance from the axis of the driving gear-sector and the teeth of the driven gear-sector being disposed at progressively decreasing distance from the axis of the driven gear-sector, and such eccentricity of the gear-sectors providing relatively low gear-ratio drive to the gate at the beginning of its movement from non-operated position with increased gear-ratio drive as the gate moves toward operated position; interengageable means integral with the gear-sectors and operative to hold the gate in operated position while the gear-sectors are out of mesh, and interengageable means integral with the gear sectors and operative to restore the gear-sectors to mesh as the driving gear-sector is returned toward non-operated position.

5. A stand-by valve comprising: a gate normally retained in non-operated position and movable to operated position on occurrence of an emergency; driving and driven eccentric gear-sectors operable to move the gate from non-operated position to operated position and then move out of mesh, the teeth of the driving gear-sector being disposed at progressively increasing distance from the axis of the driving gear-sector and the regular teeth of the driven gear-sector being disposed at progressively decreasing distance from the axis of the driven gear-sector, and such eccentricity of the gear-sectors providing relatively low gear-ratio drive to the gate at the beginning of its movement from non-operated position with increased gear-ratio drive as the gate moves towards operated position; an arcuate convex flange integral with the driving gear-sector, the flange being disposed perpendicularly to the axis of the driving gear-sector and being positioned in axially overlapping relation to the driven gear-sector; a stop integral with the driven gear-sector and operative to engage said flange as the gate reaches operated position, said flange having an edge portion which is concentric with the axis of the driving gear-sector and which in the operated position of the gate closely overlies the tip of the last regular tooth of the driven gear-sector and thereby blocks reverse movement of the gate while the gear-sectors are out of mesh; a long resetting tooth at the trailing end of the driven gear-sector for bringing the sectors back into mesh when the driving gear-sector is returned toward stand-by position, said resetting tooth extending beyond the eccentric line established by the tips of the regular teeth of the driven gear-sector and being of reduced axial dimension to overlie said arcuate flange when the gate is in operated position; a lever arm for imparting torque to the driving gear-sector; and means for applying operating force to the lever arm upon occurrence of the contemplated emergency.

6. A valve comprising: a flow-controlling element movable from non-operated position to operated position; driving and driven eccentric gear-sectors operable to move the flow-controlling element from non-operated position to operated position and then move out of mesh, the teeth of the driving gear-sector being disposed at progressively increasing distance from the axis of the driving gear-sector and the regular teeth of the driven gear-sector being disposed at progressively decreasing distance from the axis of the driven gear-sector, and such eccentricity of the gear-sectors providing relatively low gear-ratio drive to the flow-controlling element at the beginning of its movement from non-operated position with increased gear-ratio drive as the flow controlling element moves towards operated position; an arcuate convex flange disposed perpendicularly to the axis of the driving gear-sector and movable with the driving gear-sector; a stop movable with the driven gear-sector and operative to engage said flange as the flow-controlling element reaches operated position, said flange having an edge portion which is concentric with the axis of the driving gear-sector and which in the operated position of the flow-controlling element lies adjacent to means movable with the driven gear-sector and blocks reverse movement of the flow-controlling element while the gear-sectors are out of mesh; and a long resetting tooth at the trailing end of the driven gear-sector for bringing the sectors back into mesh when the driving gear-sector is returned to non-operated position, said resetting tooth extending beyond the eccentric line established by the tips of the other teeth of the driven gear-sector and being offset to move alongside said arcuate flange as the flow-controlling element moves to operated position.

7. A valve comprising: a flow-controlling element movable from non-operated position to operated position; driving and driven eccentric gear-sectors operable to move the flow-controlling element from non-operated position to operated position and then move out of mesh, the teeth of one of said gear-sectors being disposed at progressively increasing distance from the axis of that gear-sector and the teeth of the other of said gear-sectors being disposed at progressively decreasing distance from the axis of that gear-sector, and such eccentricity of the gear-sectors providing one gear-ratio drive to the flow-controlling element at the beginning of its movement from non-operated position and another gear-ratio of drive to the flow-controlling element as it moves into operated position; a flange disposed perpendicularly to the axis of the driving gear-sector and movable with the driving gear-sector, said flange having an edge portion which is concentric with the axis of the driving gear-sector and is in engagement with portions of the driven gear-sector element when the gear-sectors are out of mesh, for holding the flow-controlling element in operated position; and interengageable means carried by the gear-sectors and operative to restore the gear-sectors to mesh as the driving gear-sector is returned toward non-operated position.

8. A valve comprising: a flow-controlling element movable from non-operated position to operated position; driving and driven eccentric gear-sectors operable to move the flow-controlling element from non-operated position to operated position and then move out of mesh, the regular teeth of one of said gear-sectors being disposed at progressively increasing distance from the axis of that gear-sector and the regular teeth of the other of said gear-sectors being disposed at progressively decreasing distance from the axis of that gear-sector, and such eccentricity of the gear-sectors providing one gear-ratio drive to the flow-controlling element at the beginning of its movement from non-operated position and another gear-ratio drive to the flow-controlling element as it moves into operated position; an arcuate flange movable with the driving gear-sector, said flange having a portion which is concentric with the axis of the driving gear-sector and which moves into blocking relation to the last regular tooth of the driven gear-sector as the gear-sectors move out of mesh, to hold the flow-controlling element against reverse movement; and interengageable means carried by the gear-sectors and operative to restore the gear-sectors to mesh as the driving gear-sector is returned towards non-operated position.

9. A weight actuated valve comprising: a flow-controlling element movable from non-operated position to operated position; driving and driven eccentric gear-sectors operable to move the flow-controlling element from non-operated position to operated position and then move out of mesh, the regular teeth of one of said gear-sectors being disposed at progressively increasing distance from the axis of that gear-sector and the regular teeth of the other of said gear-sectors being disposed at progressively decreasing distance from the axis of that gear-sector, and such eccentricity of the gear-sectors providing one gear-ratio drive to the flow-controlling element at the beginning of its movement from non-operated position and another gear-ratio drive to the flow-controlling element as it moves into operated position; a lever for oscillating the driving gear-sector, said lever being in non-vertical position when the flow-controlling element is in non-operated position; a weight releasable for moving the lever to depending vertical position, the driving and driven gear-sectors running out of mesh as the lever substantially reaches depending vertical position, so as to permit the lever to thereafter oscillate freely through a limited arc without moving the driven gear-sector; an arcuate flange movable with the driving gear-sector, said flange having a portion which is concentric with the axis of the driving gear-sector and moves into blocking relation with the last regular tooth of the driven gear-sector as the gear-sectors move out of mesh, to hold the flow-controlling element against reverse movement; and interengageable means carried by the gear-sectors and operative to restore the gear-sectors to mesh as the driving gear-sector is returned toward non-operated position.

10. A valve comprising: a flow-controlling element movable from non-operated position to operated position; driving and driven eccentric gear-sectors operable to move the flow-controlling element from non-operated position to operated position and then move out of mesh, the teeth of one of said gear-sectors being disposed at progressively increasing distance from the axis of that gear-sector and the teeth of the other of said gear-sectors being disposed at progressively decreasing distance from the axis of that gear-sector, and such eccentricity of the gear-sectors providing one gear-ratio drive to the flow-controlling element at the beginning of its movement from non-operated position and another gear-ratio drive to the flow-controlling element as it moves into operated position; an arcuate convex flange movable with the driving gear-sector, said flange having a portion which is concentric with the axis of the driving gear-sector; a stop movable with the driven gear-sector and operative to engage said concentric portion of said flange as the flow-controlling element moves into operated position to limit forward movement of the flow-controlling member; and a long resetting tooth at the trailing end of the driven gear-sector for bringing the sectors back into mesh as the driving gear-sector is returned toward non-operated position, said resetting tooth extending beyond the eccentric line established by the tips of the other teeth of the driven gear-sector and being offset to move alongside said arcuate flange as the flow-controlling element moves to operated position.

WILLIAM HARROWER.

REFERENCES CITED

The following references are of record in the file of this patent:

UNITED STATES PATENTS

| Number | Name | Date |
|---|---|---|
| 179,737 | Smith | July 11, 1876 |
| 1,485,002 | Wilson | Feb. 26, 1924 |
| 1,797,490 | Wilson | Mar. 24, 1931 |
| 2,057,702 | Belknap | Oct. 20, 1936 |
| 2,469,106 | Dickerman | May 3, 1949 |